Figure 1:
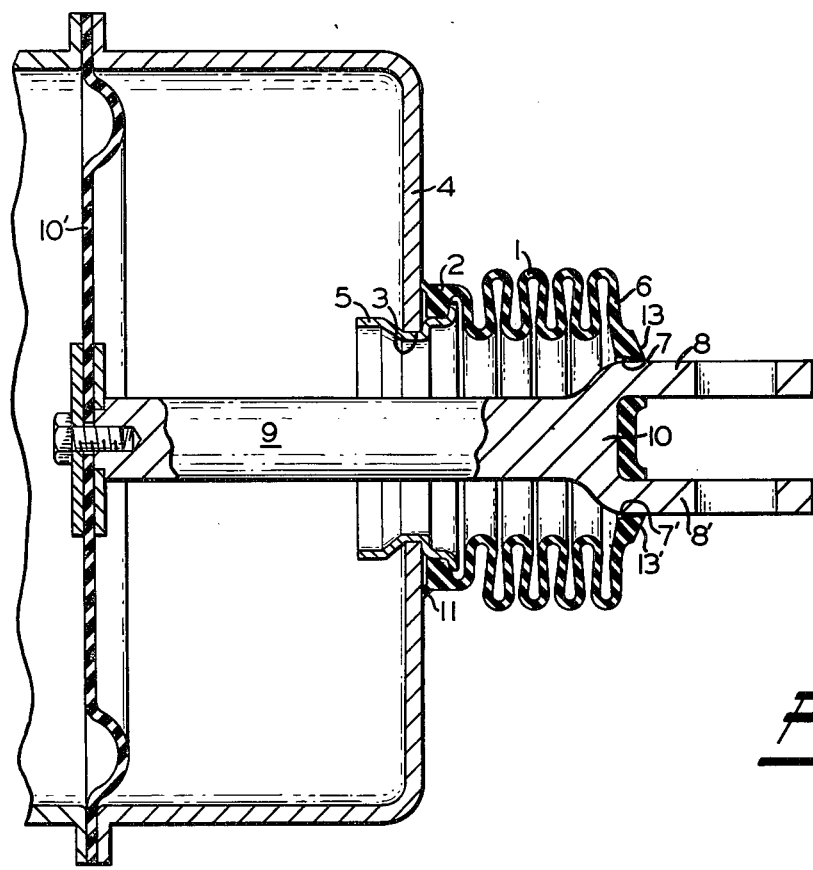

United States Patent [19]

Gross et al.

[11] 4,116,115
[45] Sep. 26, 1978

[54] BELLOWS FOR SEALING OFF THE PISTON ROD PASSAGE IN AN OPERATING CYLINDER

[75] Inventors: Friedrich Gross, Harenberg; Peter Binder, Wunstorf; Dieter Brehmer, Hanover, all of Fed. Rep. of Germany

[73] Assignee: WABCO Westinghouse GmbH, Hanover, Fed. Rep. of Germany

[21] Appl. No.: 773,596

[22] Filed: Mar. 2, 1977

[30] Foreign Application Priority Data

Mar. 30, 1976 [DE] Fed. Rep. of Germany ....... 2613447

[51] Int. Cl.² .............................................. F15J 15/18
[52] U.S. Cl. ...................................... 92/168; 74/18.2; 277/212 FB
[58] Field of Search .............. 92/168, 165 R; 74/18.2; 277/200, 212 FB, 30, 31

[56] References Cited

U.S. PATENT DOCUMENTS 3,227,053  1/1966  Spalding ................................ 92/168

FOREIGN PATENT DOCUMENTS 1,032,679  6/1958  Fed. Rep. of Germany ............ 74/18.2
2,109,957  9/1972  Fed. Rep. of Germany ............ 92/168

Primary Examiner—Paul E. Maslousky
Attorney, Agent, or Firm—R. S. Visk; R. W. McIntire, Jr.

[57] ABSTRACT

A bellows type sealing member for sealing off a piston rod opening formed at one end of an operating cylinder for accommodating reciprocal movement of a piston rod therein, in particular a diaphragm type cylinder for vehicle air-brake systems, wherein the piston rod has one end connected to a diaphragm disk and is provided at the other end with a forkhead, and the bellows can be sealingly fitted on a sleeve-like support member mounted coaxially in the piston rod opening of the diaphragm cylinder.

5 Claims, 2 Drawing Figures

BELLOWS FOR SEALING OFF THE PISTON ROD PASSAGE IN AN OPERATING CYLINDER

BACKGROUND OF THE INVENTION

The purpose of a bellows sealing member of the above type is to seal off the opening - which must be relatively large on account of the necessary piston rod movement - in the end wall of the diaphragm cylinder for accommodating the piston rod movement, in such a manner that the spring chamber and the members of the diaphragm cylinder located therein are protected against entry of foreign materials and other impurities therein caused by splashing water, dirt thrown up by the vehicle wheels or other, similarly aggressive elements. There are known bellows type sealing members presently whose ends are each provided with a torus, by which one end of the bellows can be fastened to a support member coaxially fixed in the piston rod opening of the diaphragm cylinder, and the other end can be pulled over the piston rod and attached thereto for instance by means of a clamp. This is disadvantageous, however, since, in order to mount the bellows, either the forkhead has to be removed from the piston rod or the bellows has to be slit at the end secured to the piston rod, thus causing a leak. A further disadvantage would occur with a piston rod having a non-detachable forkhead, so that the opening in the upper part of the diaphragm cylinder for the piston rod passage is irregular rather than round and, therefore, cannot be sufficiently covered by the torus.

SUMMARY OF THE INVENTION

The object of the invention is to provide a bellows type sealing member as initially described herein and of such design that mounting said bellows on a piston rod having a non-detachable forkhead can be done in a simplified manner. The opening at one end of the bellows designed for fitting over the forkhead fixedly attached to the piston rod, is essentially round but corresponds to the cross section of the forkhead, while a round opening at the other end of the bellows is provided for the fitting over the support member disposed in the end wall of the cylinder through which the the piston rod of the diaphragm cylinder extends.

This object is attained, according to the invention, in that the bellows is provided at one end with an annular portion or torus which can be fitted over and around a flanged collar-like portion of a sleeve like guide member or holding support disposed in an opening formed in the end wall of the diaphragm cylinder through which the piston rod extends, said annular post having an uninterrupted lip-type sealing piston surrounding its outer periphery disposed coaxially with the axis of the bellows and which, with the torus fitted in place, lies with its inner side under tension against the outer surface of said end wall. The other end of the bellows is provided with an end cover which is reinforced in its central area and can be pulled, via conforming openings made therein, over the legs of the forkhead.

The advantages which can be obtained with the use of the bellows type sealing member above-described reside particularly in the fact that the lip-type sealing portion peripherally surrounding the one end and adapted for fitting over the collar-like portion of the holding support in the end wall opening lies with its inner surface under tension against the outer surface of said side wall, and, covers in a secure manner, said side wall opening. The end wall opening made in conformity with the cross section of the forkhead and is provided for accommodating reciprocal movement of the piston rod. The lip-type sealing portion of the bellows cooperates with the outer surface of the end wall to provide an elastic sealing seat which, is effective even in the case of lateral piston rod movement, for preventing dirt, splashing water and other, similarly aggressive elements from penetrating into the spring chamber of the diaphragm cylinder. Furthermore, the bellows end cover adjacent the forkhead is provided with openings corresponding in shape to the cross section of the legs of the forkhead and thus affords a simplified manner for mounting by merely pulling the bellows over the legs of the forkhead. Because of such an arrangement, the forkhead can now be welded, for example, or fixed in some other suitable manner, on the piston rod. This arrangement provides additional space for extension of the bellows, whereby, while maintaining the same piston stroke, the piston rod may be shorter in length for more efficient operation of the cylinder.

The sealing lips formed in the portion at the end cover of the bellows surrounding the forkhead legs produce an improved, durable sealing seat on the said legs with their inside faces slanting towards the center of the cover portion, so as to ensure, in the case of a maximum piston stroke, a close sealing contact with the outer areas of the legs of the forkhead.

Figure 2:
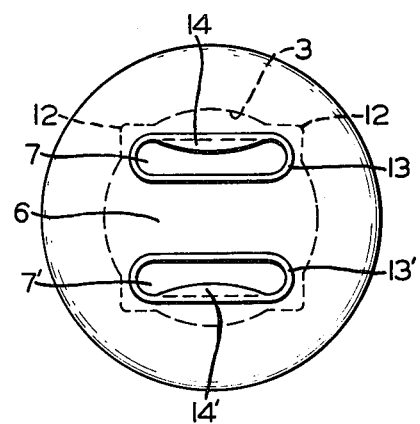

An exemplified embodiment of the invention is shown in the drawing in which:

FIG. 1 is an elevational view, in section, of a bellows type sealing member; and FIG. 2 is an end view of the bellows shown in FIG. 1 in an unmounted disposition with the opening in the end of the diaphragm cylinder being shown in broken outline.

A bellows type sealing member 1, shown in FIG. 1 and composed of an elastic material, is provided at one end with an annular sealing portion or torus 2 which is fitted over a holding support member 5 for the bellows secured in an opening or hole 3 formed in an end wall 4 of a diaphragm cylinder device, and at the other end with a reinforcing membrane or cover position 6 which, by way of openings 7, 7' made therein, is pulled over the legs 8, 8' of a forkhead 10 attached to a piston rod 9 having an inner end thereof secured to and movable with a diaphragm 10' of the cylinder device.

The torus 2 is provided with a continuous sealing lip 11 which is disposed coaxially the axis of the bellows 1 around the outer peripheral edge of the torus and which has the inner surface thereof slanting towards the axis of the bellows and which, when the torus 2 is fitted on the holding support 5, lies with its inner surface under tension against the outer surface of the end wall 4 of the diaphragm cylinder and, as shown in FIG. 2, covers, in a secure manner, including quadratic recesses 12, the hole 3 provided in the end wall 4 of the diaphragm cylinder for reciprocal, and possible lateral, movement of the piston rod 9, said quadratic recesses being formed to correspond to the cross section of the forkhead 10, so that the forkehad 10 fixedly attached to the piston rod 9 may also pass through said hole.

The cover portion 6 is reinforced in its central area the membrane having the openings or holes 7, 7' corresponds in shape to the cross section of the legs 8, 8' of the forkhead 10.

The peripheries of each opening or hole 7, 7' of the cover portion 6 are provided with respective continuous sealing lips 13, 13' which are in close contact with the legs 8, 8' of the forkhead 10 and which — as is apparent from FIG. 2 — each have, in their area turned away from the center of the cover portion 6, a camber 14, 14' which — as is apparent from FIG. 1 — is slanted towards the respective inside edge of the cover portion 6 formed by the holes 7, 7'.

The bellows type sealing member constructed 1 and assembled in the manner above-described, with the piston rod 9 in an initial or retracted position, as shown in FIG. 1, is in a substantially compressed or folded state, and may expand only as far as the legs 8, 8' of the forkhead 10.

Upon occurrence of a maximum piston stroke, cover portion 6 of the bellows 1, being engaged by the forkhead 10, is taken along therewith to the extreme-right hand position of piston rod 9 and is expanded within its folding range, the sealed condition remaining, however, entirely intact both at the forkhead 10 (the sealing lips 13, 13' now making entirely flat contact in the area of their cambers which lie against the legs 8, 8' and are slanted towards the inside edges, formed at the openings or holes 7, 7', of the cover portion 6) and at the end wall 4 of the diaphragm cylinder as a result of its elastic form, offering maximum covering towards the outer limits because of the sealing lip 11 lying with its inner surface under tension against the surface of the end wall 4 of the diaphragm cylinder.

Having now described the invention, what we claim as new and desire to secure by Letters Patent, is:

1. A bellows type sealing member for sealing off an opening formed in an end wall of a diaphragm type operating cylinder, in particular a diaphragm cylinder for vehicle air-brake systems, for accommodating reciprocal movement of a piston rod, wherein the piston rod is connected at one end to a diaphragm in the cylinder and is provided at the other end with a forkhead, and the bellows can be fitted on a holding support mounted in said opening in the diaphragm cylinder in the area of the piston rod movement, characterized in that the bellows is provided at one end with an annular portion of torus by which the bellows can be fitted on the holding support and which has a continuous sealing lip along its outer peripheral edge disposed coaxially to the axis of the bellows and which, with the torus fitted in place, lies with an inner surface under tension against a surface of the end wall of the diaphragm cylinder, while the other end, provided with a cover portion which is reinforced in its central area and can be pulled, by way of conforming openings made therein, over respective legs of the forkhead.

2. A bellows type sealing member according to claim 1, characterized in that said inner surface of the sealing lip is slanted towards the axis of the bellows.

3. A bellows type sealing member according to claim 1, characterized in that said cover portion is provided around the respective peripheral edges of said openings formed in said cover portion, with a continuous sealing lip which lies in close contact with the legs of the forkhead.

4. A bellows type sealing member according to claim 3, characterized in that the sealing lips of the openings in the cover portion are each provided, in the area remote from the center of the cover portion, with a camber slanting towards the center of the cover portion.

5. A bellows type sealing member according to claim 4, characterized in that the cambers of the sealing lips are slanted on the respective inside faces, formed at the openings of the cover portion.

* * * * *